E. HAMBUJER.

Assignor to E. L. Hutchinson.

TICKET-BOXES.

No. 7,842. Reissued Aug. 14, 1877.

Attest:
W. C. McArthur
E. L. Everett

Inventor:
E. Hambujer
by Edwin L. Hutchinson
Attorney.

N. PETERS, PHOTO-LITHOGRAPHER, WASHINGTON, D. C.

UNITED STATES PATENT OFFICE.

EPHRAIM HAMBUJER, OF DETROIT, MICHIGAN, ASSIGNOR TO EDWIN L. HUTCHINSON, OF AUBURN, NEW YORK.

IMPROVEMENT IN TICKET-BOXES.

Specification forming part of Letters Patent No. 48,274, dated June 20, 1865; Reissue No. 7,842, dated August 14, 1877; application filed June 11, 1877.

*To all whom it may concern:*

Be it known that I, EPHRAIM HAMBUJER, of Detroit, in the county of Wayne and State of Michigan, have invented certain new and useful Improvements in Ticket-Boxes; and I do hereby declare that the following is a full, clear, and exact description thereof, reference being had to the accompanying drawings, and to the letters of reference marked thereon, which form a part of this specification.

Figure 1:
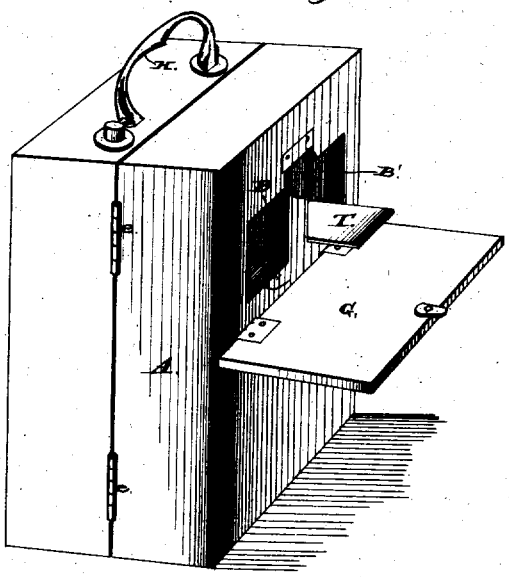
Figure 2:
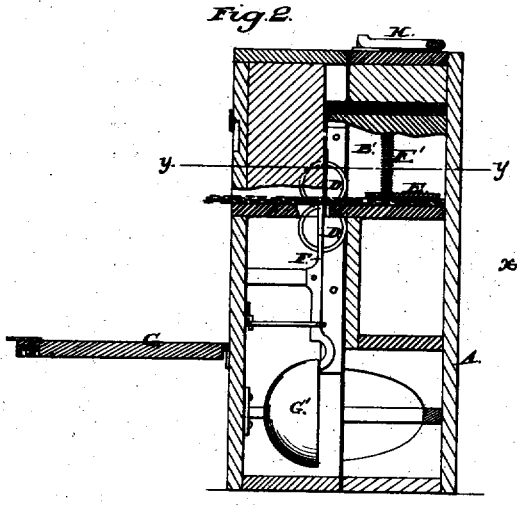
Figure 3:
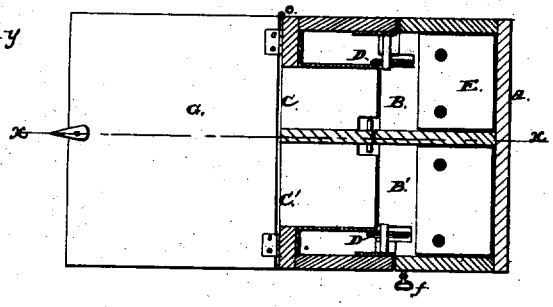
Figure 4:
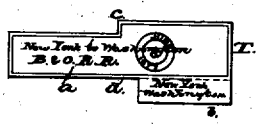

Figure 1 in the drawings represents a perspective view of the invention. Fig. 2 is a longitudinal vertical section, and Fig. 3 a horizontal section, of the same. Fig. 4 shows one of the tickets used in the box.

Like letters of reference designate like parts in each of the figures.

The object of my invention is to protect railroad and other companies from fraud by the conductors, who, under the present arrangement, are enabled to sell any number of tickets to passengers on the route, and put the proceeds into their own pockets, without possibility of being detected. This difficulty is obviated by the use of the box which forms the subject-matter of this present invention.

This invention contains the following characteristic features: First, cutters for canceling or cutting pieces from tickets, to be preserved as checks for the tickets; second, a box or chamber to receive and hold the pieces cut from the tickets; third, a bell so arranged in the box as to produce a sound every time the cutters are operated; fourth, inclosing the tickets in the box with the cutters, so that the number remaining in the box after the cutters have been actuated will indicate the number of times the cutters have been operated; fifth, the construction of tickets in a peculiar manner, so that each ticket, as a piece is cut from it, is used as a lever or handle for actuating the cutters and other elements of the machine; sixth, the combination of two or more sets of cutters and compartments for the different kinds of tickets used.

The essence of my invention consists in combining and arranging these well-known characteristic features, in whole and in part, so as to produce novel and beneficial results.

My invention consists, first, in the combination, with a machine for cutting pieces or checks from tickets, of a bell, in such a manner that each time the cutters are actuated the bell will be rung, whereby the passengers are notified each time a ticket is used that a check has been cut from it; second, the combination, in a machine for cutting checks from tickets, of a bell, and a box or chamber to receive the cuttings, so as to operate each time the cutters are actuated, whereby the sounding of the bell for the time being, and the saving of the cuttings for future reference, all being locked and beyond the control of the conductor, (except when he cancels a ticket,) insures the collection and return of the fares.

The tickets are made in two sections—one to be retained by the passenger or conductor, and the other to serve as a check for the ticket, and to be returned with the box to the company.

The tickets are inclosed in the box, and are so placed in relation to suitable knives or circular cutters that whenever one of them is withdrawn from the box that portion which is intended to serve as a check is cut off and retained in a suitable chamber in the box, while the other portion is handed to the passenger, and afterward taken back by the conductor.

The tickets are also provided with a shoulder, which serves to actuate the clapper of a bell whenever one of the tickets is withdrawn from the box, and thereby the attention of the passengers is called to the fact that the conductor has really taken the ticket from the box and not from any other place.

A represents a box, made of wood or any other suitable material, and so arranged, by means of hinges and a lock, that it can be securely fastened, the key being kept in the hands of the railroad or other company.

The interior of the box is divided into a series of compartments, B B′, (two only being shown in the drawing,) which are intended to hold the different tickets required on a certain route.

These compartments are either stationary, as shown in the drawing, or they may be arranged in a revolving cylinder.

In the former case the box must be provided with as many apertures C C′ as there are compartments, so that access can be had to each of the same for the purpose of withdrawing a ticket; but in the latter case (if the compartments are arranged in a revolving cylinder) one aperture in the box is sufficient, and by turning the cylinder the several compartments are brought successively opposite said aperture, according to the class of ticket required.

The tickets T are made in a peculiar form, as shown in Fig. 4. The main portion *a* forms that part which is intended for the passenger, and which is used as a handle to pull it from the box, and afterward to be taken up by the conductor. The other portion, *b*, is intended as a check for the ticket, so that when the main ticket *a* is withdrawn the check *b* is cut off and retained in the chamber for the cuttings, and finally delivered with the box to the company. The tickets are also provided with a shoulder, *c*, which is designed to actuate the bell-striker when a ticket is withdrawn from the box.

The tickets are placed in the compartments B B′, each compartment containing its own class or kind of tickets, so that there should be as many separate compartments for tickets as there are different tickets used on the route. For instance, the compartment B will contain tickets for New York to Philadelphia, and the compartment B′ will hold those for New York to Washington, and so on.

The tickets are placed in the compartments B B′ in such a position that the edge *d* of the main ticket lies close to the cutters D, which are arranged in front of each compartment, while the ends of the tickets extend out through the aperture C or C′, so that they can be used as handles to be grasped by the hand and drawn out of the box.

When the conductor starts out on a trip he is charged with the number of tickets in the box, and on his return the original number charged to him less those still uncanceled in the box will indicate the number of tickets he has canceled and the number of fares received, also the different kinds of fares and the number of each kind received.

Suitable presser-plates E hold the tickets in the compartments B B′ in their proper position down to the partition-plate, so that whenever one ticket is withdrawn the presser-plate E, actuated by the spring E′, forces the next ticket into the vacated space ready to be drawn from the box; or, in other words, each time a ticket is withdrawn the succeeding ticket takes its place, each ticket being forced into its place next to the partition-plate by the plate E, actuated by the spring E′.

The shoulders *c* of the tickets are opposite to the upper end of the hammer F of a bell, G′, which is situated in the lower part of the box, as clearly shown in Fig. 2.

When one of the tickets is drawn out by the conductor, the shoulder *c* of the ticket raises the hammer F, which is released on the passage of the ticket, so as to strike the bell and produce a sound, which calls the attention of the passenger to the fact that a ticket has been withdrawn from the box. By the same movement of the ticket which causes the bell to sound, a check, *b*, is cut from the ticket by the cutters D, and drops into the chamber in the lower part of the box, to which access can only be had by unlocking the box.

G is a hinged door, which shuts over the apertures C C′ when the box is not in use.

The box is made in two parts—one part hinged to the other at *e*, and provided with a lock and key, *f*, so that by unlocking and opening the box, the bell and its striking mechanism, the chamber containing the cuttings, the cutters, and the tickets will all be easily accessible.

H is a handle for carrying the box.

Having thus fully described my invention, what I claim as new, and desire to secure by Letters Patent, is—

1. The combination, with a machine for cutting pieces or checks from tickets, of a bell arranged to be rung or sounded each time and at the same time as the cutters are actuated, for the purposes herein set forth.

2. The combination, in a machine for cutting checks from tickets, of a bell and a box or chamber to receive the cuttings, for the purposes herein set forth.

In testimony that I claim the foregoing as my own I affix my signature in presence of two witnesses.

E. HAMBUJER.

Witnesses:
H. S. SPRAGUE,
CHAS. J. HUNT.